United States Patent [19]
Giebler

[11] 4,012,676
[45] Mar. 15, 1977

[54] DEVICE FOR DRIVING RECORDERS AND PRINTING CARRIAGES IN DATA RECORDERS

[75] Inventor: Fritz Giebler, Munich, Germany

[73] Assignee: Siemens Aktiengesellschaft, Berlin & Munich, Germany

[22] Filed: Feb. 13, 1974

[21] Appl. No.: 442,215

[30] Foreign Application Priority Data
Feb. 27, 1973 Germany .................. 2309750

[52] U.S. Cl. .................. 318/135; 310/13; 318/687
[51] Int. Cl.² .................. H04L 17/30
[58] Field of Search .................. 310/12, 13, 14; 318/135, 37, 38, 687; 178/33

[56] References Cited
UNITED STATES PATENTS

| | | | |
|---|---|---|---|
| 2,889,503 | 6/1959 | Chambers | 310/12 |
| 3,688,035 | 8/1972 | Cless | 310/13 X |
| 3,816,777 | 6/1974 | Metzgar et al. | 310/13 |

Primary Examiner—Gerald Goldberg
Attorney, Agent, or Firm—Hill, Gross, Simpson, Van Santen, Steadman, Chiara & Simpson

[57] ABSTRACT

A device, particularly for driving recording or printing carriages in data recorders and the like, utilizing a linear motor, in which a current carrying coil is movably guided along a pair of ferromagnetic rails which are magnetically polarized by suitable magnetizing means to produce a directional field between the rails, whereby the current carrying coil is moved along the rails in response to current passing through the coil. Means are also provided for controlling the movement of the coil in predetermined stabilized steps.

5 Claims, 8 Drawing Figures

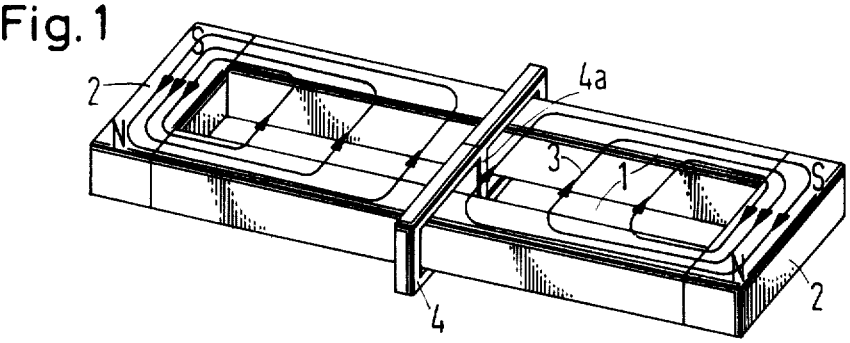
Fig. 1
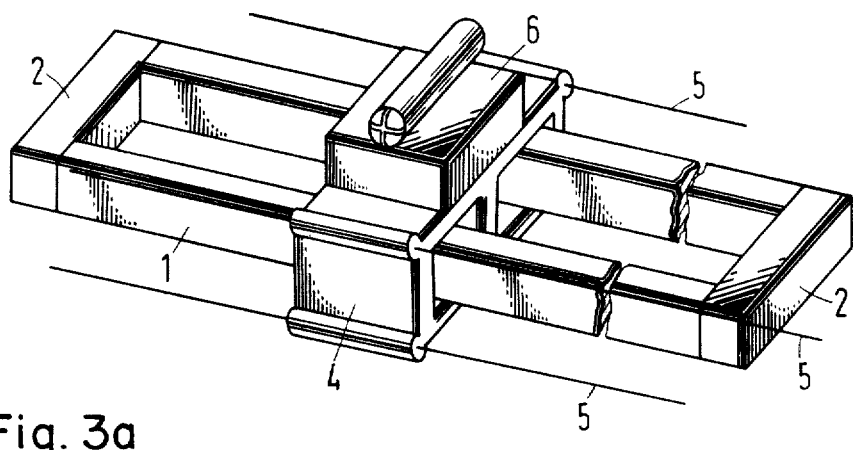
Fig. 2
Fig. 3a
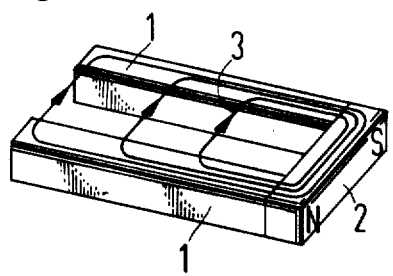
Fig. 3b
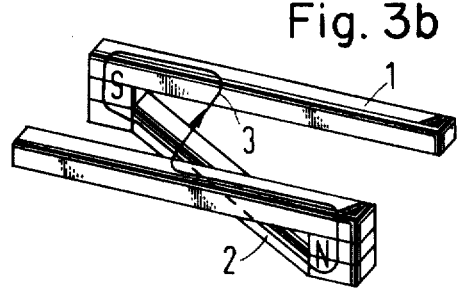

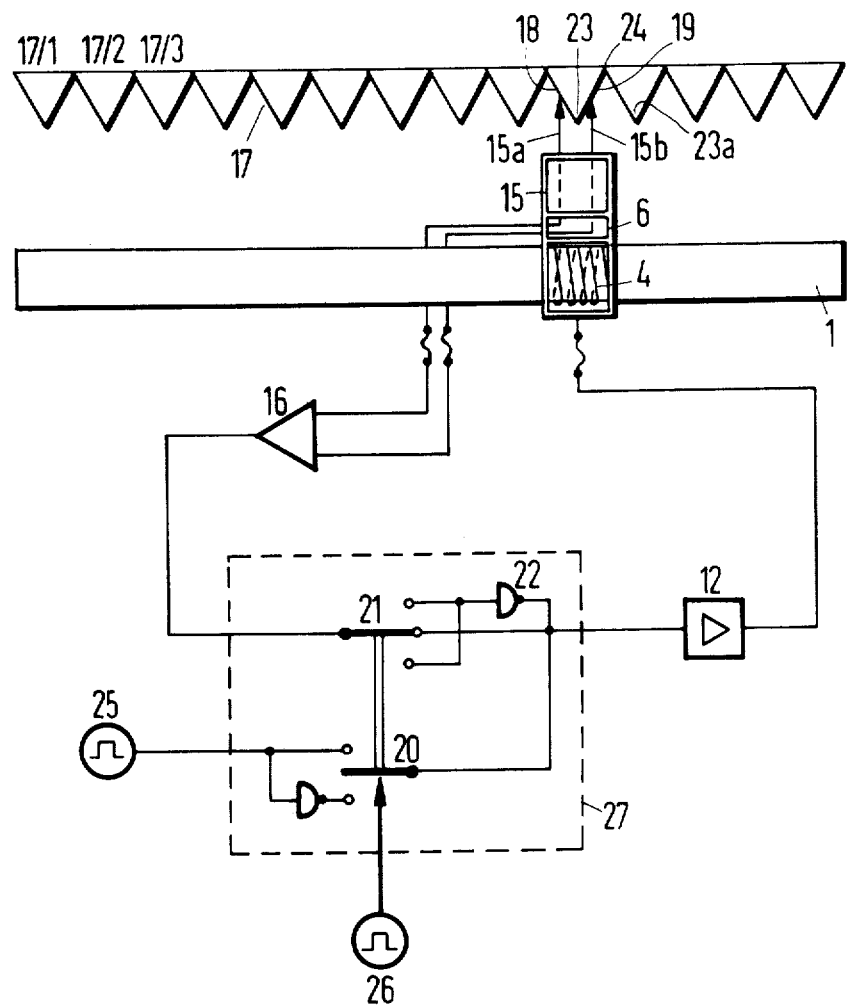

DEVICE FOR DRIVING RECORDERS AND PRINTING CARRIAGES IN DATA RECORDERS

BACKGROUND OF THE INVENTION

The invention is directed to a device for driving recording carriages and the like, particularly in data recorders, employing a linear motor.

Silent operation is of great importance in such a drive, as well as speed and accurate and exact controllability during step-wise operation and with uniformity, particularly in the application of ink-jet recorders. Previously used drives employed in such applications normally involved a plurality of mechanical components and in the case of data recorders presently in use, the recording carriage preferably is moved, by means of suitable belt or ratchet devices, along suitable guide members which extend in parallel direction with respect to the paper carriage. An arrangement of this type is particularly suitable for the utilization of linear drive means.

Linear motors are known in which a suitable coil or winding support is movable in an air gap under the action of several permanent magnets and in which the current supply to the winding support is effected by means of suitable sliding contacts (German Pat. No. 1,106,855). It is also additionally known to employ a rigid winding support member instead of a flexible support and to move the magnet carrier instead of the winding. However, all of such linear motors employ relatively extended coil windings which are supplied with current over sliding contacts, with the electromotive force acting on such coil to produce a forward thrust which is operable upon the coil with the cooperation of suitable mechanical devices, whereby the coil structure is substantially the equivalent to the drive structures previously described in connection with data recorders. Consequently, this type of device does not offer any great advantages, as compared to the described previously used drives, as a result of the relatively great masses which must be accelerated.

A teleprinter drive employing a linear electromotor is known from Offenlegungsschrift No. 2,126,481 in which, for the production of the desired magnetic field, a permanent magnet is disposed between two parallel plates which are connected over a magnetic bridge. However, the production of the necessary magnetic field by means of a relatively long elongated permanent magnet presents considerable disadvantages with respect to the control of the electromotive forces in the driving coil. It will be appreciated that the manufacture of uniformly magnetized plates which extend over a large area is, in particular, technically difficult. Due to the required field strength distribution, the magnetic plates in such an arrangement cannot be extended to the edge of the ferromagnetic rails whereby considerable stray fields result, particularly at the edges. The alternative utilization of electromagnets also is not practical as it is difficult to produce a sufficiently exact gap variation in the magnetic field, in order to produce, for example, a space dependent force, i.e., a force varying with the field gap. The disposition of the magnetic field in the air gap requires a relatively large dimensioning of the entire structure and consequently results in greater weight.

BRIEF SUMMARY OF THE INVENTION

The invention therefore is directed to the problem of producing an electromotive force, satisfactory for a necessary drive thrust, without employing a special band-shaped coil support, and to provide a particularly exact control of the electromotive force, making it possible to achieve an exact positioning of the structure, particularly during a step-wise operation.

The problem is solved in accordance with the invention by the provision of two elongated ferromagnetic guide rails, disposed in parallel arrangement and having a relatively narrow spacing therebetween, with at least one magnet being so arranged that a directional magnetic field is created between the two rails, and with a current carrying coil movably guided along such rails.

Accurate control of the advancing movement with respect to both position and speed may be achieved by the use of a measuring or monitoring coil, which in a further development of the invention is provided in addition to the drive coil. With such monitoring coil, a voltage is induced in dependence upon the movement involved, whereby such voltage may be compared, in a suitable comparator, with a given desired value, which voltage accordingly controls the driving coil over an amplifier.

If a space-dependent action is desired at the driving coil to effect a reduction in the period of acceleration of the recording head, for example, during utilization in an ink-jet recorder, in accordance with a further preferred development of the invention, recesses may be provided in the ferromagnetic rails which are so disposed that a selective or variable field distribution of the magnetic field exists between the individual rails, whereby greater forces are developed at the driving coil during the initial and terminal advancing movement of the driving coil, i.e., at the portion of the rails at which the coil movement begins and at the portion at which such movement ends.

The invention has in particular the advantages that the magnetic field can be produced by the utilization of merely a single relatively small magnet, which, for example, can also be an electromagnet, and that in addition the magnetic field extends completely uniformly without the production of interfering stray fields. The direction and extent of the driving force can be controlled by the current in the coil which thus, in the practice of the invention, enables the movements of the printing carriage for both forward and return motion, as well as acceleration and braking forces to be controlled in an ink-jet recorder by suitable electronic means. Further, the stray fields of the magnetic field can also be employed for the forward thrust by the utilization of a specially constructed driving coil in the form of a double coil. The total weight of the masses required to be accelerated remains particularly small as a result of the described construction, which is of particular advantage for a step-wise driving action. The assembly of the drive structure is extremely simple and consequently maintenance is particularly easy and the production of such a drive may be achieved at a particularly low cost. In addition, the structure has the great advantage of being almost noiseless in operation.

BRIEF DESCRIPTION OF THE DRAWINGS

In the drawings, which illustrate several embodiments of the invention, and in which like reference characters indicate like or corresponding parts;

FIG. 1 is an isometric view of a drive structure embodying the basic principles of the invention;

FIG. 2 is a similar figure illustrating a practical embodiment of the invention;

FIG. 3a and FIG. 3b illustrate several magnet arrangements which can be employed;

FIG. 7 schematically illustrates a drive structure for providing step-wise advance, including a control circuit, for use in a printer mechanism.

DETAILED DESCRIPTION OF THE INVENTION

Figure 4:
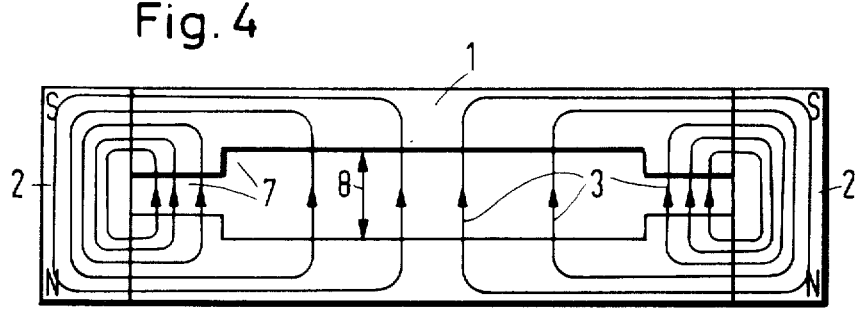
FIG. 4 is a plan view of a magnet arrangement for providing a variable field distribution.

Referring to FIG. 1, a directional or oriented magnetic field 3 is produced between two elongated ferromagnetic rails 1 by means of a pair of magnets 2 which are disposed in abutting relation to the respective ends of the rails. Suitably guided for movement along the rails is a current carrying coil 4, the direction of movement of the coil 4 being dependent upon the direction of current in the coil, with the main forward thrust being produced by the coil portion 4a which is disposed between the rails. It will be appreciated that a single coil which encircles only one rail could, for example, be employed instead of the double coil illustrated. The double coil, however, facilitates the easier guidance of the entire device. The magnetic poles of the magnets, and thus the rails, are designated with the letters N and S. It will be appreciated that the force produced for the desired forward thrust in such an arrangement is proportional to the cross-section of the soft-iron rail, the induction produced in the iron, the number of turns of the windings and the value of current flowing through the coil. Likewise, it is inversely proportional to the total length of the soft-iron rail, in view of which it follows that the invention preferably is economical for very short to medium lines or rows of an ink-jet recorder and particularly suitable for carriages of relatively small weights.

FIG. 2 illustrates an embodiment of the invention in which the recording head 6 is suitably carried by the coil 4 which in turn is mounted for movement along guide members 5 whereby the recording head is movable along the ferromagnetic rails 1 and the permanent magnets 2 are disposed at opposite ends of the magnetic rails.

FIG. 3 illustrates several arrangements of the ferromagnetic rails and the energizing magnet for producing the desired oriented magnetic field 3 therebetween. In both arrangements, only a single magnet is employed, thus eliminating one magnet, but obviously in such construction a considerably stronger magnet must be employed. In FIG. 3a the magnet is disposed at one of the adjacent pairs of rail ends while in FIG. 3b the magnet extends diagonally from one rail end to the opposite end of the other rail. Arrangements of this type are particularly advantageous when for technical construction reasons it is desirable to have the magnetic structure open at one end, for example, when the forward thrust is produced over a suitable connecting rod or the like.

FIG. 4 illustrates a magnet arrangement in which a varied field distribution 3 is achieved by the utilization of recesses 7 which produce an air gap 8 along the ferromagnetic rails which varies, i.e. may of lesser width adjacent the ends of the rails than at the intermediate portion thereof. Consequently, with such a construction greater forces will be produced at the beginning and at the end of the travel as the coil will at such times be moving in an area of greater flux density. An arrangement of this type is particularly advantageous, for example, in order to reduce the acceleration phase as well as delay at the beginning or at the end of the travel.

Figure 5:
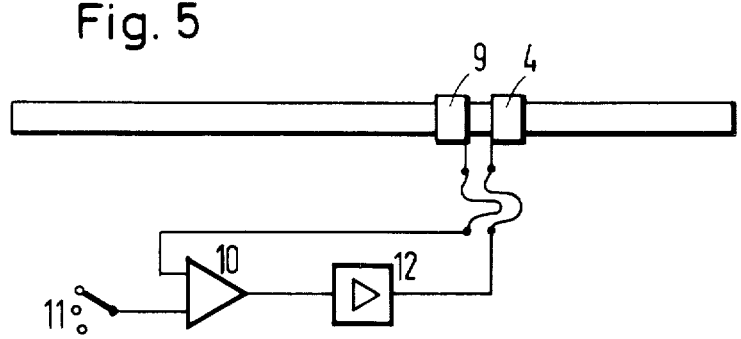
FIG. 5 schematically illustrates, in block form, the utilization of an additional control coil or loop for effecting an automatic control of the movable structure, for example, for utilization in an ink-jet recorder.

FIG. 5 illustrates, in block form, the use of a control coil or loop, for example, in the application of the invention to an ink-jet recorder, by means of which the linear motor of the present invention can be controlled in a particularly simple manner. The voltage induced in the monitoring or measuring coil 9 during the movement of the recording head is conducted to a comparator 10 in which such induced voltage is compared with a predetermined desired value by means of the switching arrangement 11, which represents data with respect to the forward motion, reverse motion and resting periods. The comparison results are then supplied to an amplifier 12 which in known manner controls the direction and speed of the printing carriage 6 by means of the supplied current. Control of the position of the carriage can be effected in suitable manner, employing, for example, known positioning circuitry and arrangements, for example, such as employed in connection with record disks, such as inductive pickups utilizing the Meander principle, optical pickups or magnetic displacement pickups.

Figure 6:
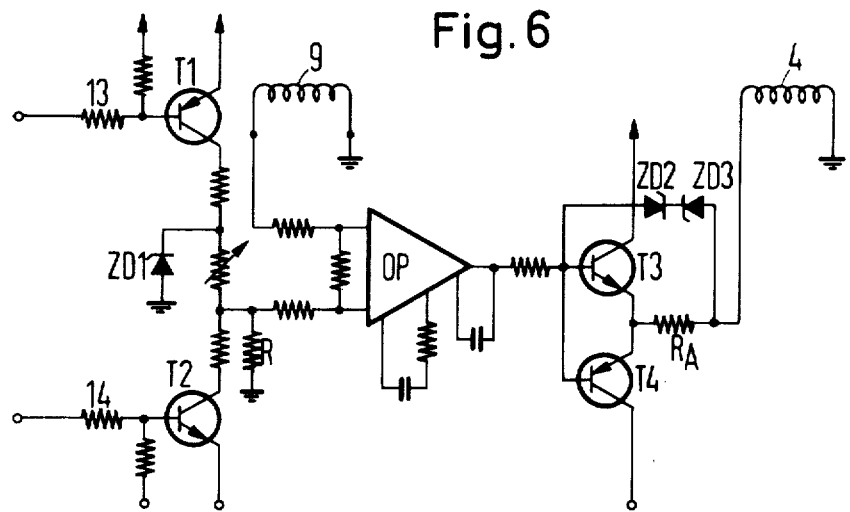
FIG. 6 illustrates a circuit diagram of a circuit suitable for use with the arrangement illustrated in FIG. 5.

FIG. 6 illustrates a circuit arrangement utilizing the control loop of FIG. 5. The desired values for the carriage forward motion and carriage return motion are established over the respective resistors 13 and 14 and respective transistors T1 and T2 with the values being stabilized by a breakdown diode ZD1. In the event neither of such values are present, the desired value for the rest state of the carriage is then automatically supplied over the resistance R. Difference amplifier OP compares the desired value with the value supplied by the measuring coil 9 and accordingly controls the drive coil 4 over the power amplifiers T3 and T4 with the resistance RA and the two breakdown diodes ZD2 and ZD3 limiting the maximum current in the coil and thereby the drive force and the acceleration of the carriage. This is necessary as the acceleration of an ink-jet recorder should not exceed a certain predetermined value otherwise the supply of ink cannot be assured.

FIG. 7 illustrates an embodiment of the invention, in block form, as applied to a printer and employing a control circuit for the step-wise feed of the carriage. Extending parallel to the magnetic rail 1 on which the drive coil 4 is movably mounted, is a position-determining rail 17 which carries a plurality of triangular locating markers 17/1, 17/2 . . . for effecting the desired positioning of the recording head. Such markers preferably are scanned with an optico-electronic device 15 which is constructed to scan two scanning points 15a and 15b and is suitably connected for movement with the drive coil 4. The two scan values are supplied to a differential scanner 16 from which is derived a difference signal of such measured points, which in turn is conducted to an electronic device 27 which controls the drive coil 4 over the amplifier 12.

The approximate positioning is effected by means of a counting of the individual triangles 17/1, 17/2, etc. of the positioning rail 17. The rest position of the printing carriage 6 is positively determined by the relationship of the inclined portions 18 and 19 of the positioning triangles 17/1, 17/2, etc. If the carriage is deflected from the stable position due to the action of an applied force, the polarity of the respective signals of the scanning points 15a and 15b provides an opposing force in the driving coil 4 which returns the carriage into the desired rest position. If the printing carriage shall be driven step-wise from position point to position point, the direction of movement of initially determined by the operation of the coupled switches 20 and 21. At the same time an unstable position is created by means of inverting the difference signal by means of the device 22, i.e. the point of stability is shifted from the triangle point 23 of the positioning point into the triangular depression 24. A deflection signal 25, the polarity of which determines the direction of movement, induces the desired movement of the printing carriage. The latter is now accelerated and drives past the stable depression 24 due to its inertia, whereby the force, acting in opposition direction, brakes the printing carriage in order to avoid the carriage stabilizing on the depression 24, with the switches 20 and 21 then being returned to their rest position by means of a reset signal supplied at 26.

The original difference signal thus acts again on the drive coil 4 and the recording carriage 6 stabilizes on the triangular point 23a. The specific time of application of the signal 26 is dependent, among other things, on the mass of the recording carriage 6, as well as the strength and duration of the deflection impulse 25, and the deflection impulse 25 is therefor controlled by an adjustable timing element.

Having thus described my invention it will be obvious that although various minor modifications might be suggested by those versed in the art, it should be understood that I wish to embody within the scope of the patent granted hereon all such modifications as reasonably and properly come within the scope of my contribution to the art.

I claim:

1. In a device, particularly for the drive of recording or printing carriages in data recorders and the like, the combination of a linear motor, having a pair of elongated, transversely spaced ferro-magnetic rails defining a working air gap therebetween, and a current-carrying drive coil movably guided upon and encircling at least one of said rails, a magnet operatively magnetically bridging the space between said rails, with one pole thereof magnetically connected to an end portion of one of such ferro-magnetic rails and the other pole thereof magnetically connected to an end portion of the other of said rails, the latter extending from their respective connected end portions parallel to one another in relatively closely spaced relation whereby one of said rails is of one magnetic polarity and the other of said rails is opposite magnetic polarity to produce a directional oriented field across said air gap throughout the effective operational length of said ferro-magnetic rails.

2. A device according to claim 1, comprising in further combination, a measuring coil cooperably movable with said drive coil, in which a voltage is induced dependent upon movement thereof, a comparator in which such voltage is compared with a predetermined value, and the output of which accordingly controls the drive coil over an amplifier.

3. A device according to claim 1, wherein the air gap between the two ferromagnetic rails is non-uniform whereby a variable field distribution of the magnetic flux density exists between the individual rails whereby greater magnetic forces are present at the drive coil at the coil-travel beginning and at the coil-travel end of the respective rails.

4. A device according to claim 1, for the control of the drive of an ink-jet recorder, wherein stabilized desired values for the recorder carriage forward motion and the carriage reverse motion are supplied to an operating amplifier over respective transistors, a measuring coil movable with said carriage, a resistance operatively connected to such operating amplifier, over which resistance the desired value for the rest state of the carriage is automatically supplied, with the operating amplifier comparing the desired value with the value supplied by said measuring coil controlling the drive coil over cooperable power transistors, and resistance and breakdown diode means operatively connected with said transistors and with said drive coil for limiting the maximum current in the latter and therewith the drive force at and acceleration of the carriage.

5. A device according to claim 1, comprising in further combination, a position-determining rail extending parallel to an adjacent ferromagnetic rail, which carries position-locating means, means cooperable with said drive coil for scanning said location positioning means, operative to produce a corresponding scanning signal, a differential amplifier to which said scanning signal is supplied and an electronic control device selectively connectible to said differential scanner, the output signal of said electronic device being operatively connected to and controlling the operation of the drive coil.

* * * * *